(12) United States Patent
Karandikar et al.

(10) Patent No.: US 12,181,853 B2
(45) Date of Patent: Dec. 31, 2024

(54) STABILITY BOUNDARY AND OPTIMAL STABLE PARAMETER IDENTIFICATION IN MACHINING

(71) Applicant: UT-Battelle, LLC, Oak Ridge, TN (US)

(72) Inventors: Jaydeep M. Karandikar, Oak Ridge, TN (US); Thomas A. Feldhausen, Oak Ridge, TN (US); Kyle S. Saleeby, Oak Ridge, TN (US); Kevin S. Smith, Oak Ridge, TN (US); Tony L. Schmitz, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 519 days.

(21) Appl. No.: 17/529,558

(22) Filed: Nov. 18, 2021

(65) Prior Publication Data

US 2022/0161381 A1 May 26, 2022

Related U.S. Application Data

(60) Provisional application No. 63/117,532, filed on Nov. 24, 2020.

(51) Int. Cl.
*G05B 19/18* (2006.01)
*G06N 20/00* (2019.01)

(52) U.S. Cl.
CPC .............. *G05B 19/18* (2013.01); *G06N 20/00* (2019.01)

(58) Field of Classification Search
CPC .......... G06N 20/00; G06N 7/01; G05B 19/18; G05B 2219/49065; G05B 13/0265
See application file for complete search history.

(56) References Cited

U.S. PATENT DOCUMENTS

| | | | | |
|---|---|---|---|---|
| 2017/0060104 A1* | 3/2017 | Genma | .............. | G05B 13/0265 |
| 2018/0052439 A1* | 2/2018 | Chen | .................. | G05B 19/4065 |
| 2019/0086888 A1* | 3/2019 | Iijima | ................ | G05B 13/0265 |
| 2020/0033842 A1* | 1/2020 | Masuda | ............. | G05B 19/4183 |
| 2020/0272122 A1* | 8/2020 | Oikawa | .............. | G05B 19/4065 |

OTHER PUBLICATIONS

Karandikar, J.M. et al., "Value of information-based experimental design: Application to process damping in milling", Precision Engineering, vol. 38, available onlin Apr. 24, 2014, pp. 1-10.
Karandikar, J. et al., "Bayesian Inference for Milling Stability Using a Random Walk Approach", Journal of Manufacturing Science and Engineering, vol. 136, Jun. 2014, pp. 1-11.

* cited by examiner

*Primary Examiner* — Mong-Shune Chung
(74) *Attorney, Agent, or Firm* — Warner Norcross + Judd LLP

(57) ABSTRACT

A Bayesian learning approach for stability boundary and optimal parameter identification in milling without the knowledge of the underlying tool dynamics or material cutting force coefficients. Different axial depth and spindle speed combinations are characterized by a probability of stability which is updated based upon whether the result is stable or unstable. A likelihood function incorporates knowledge of stability behavior. Numerical results show convergence to an analytical stability lobe diagram. An adaptive experimental strategy identifies optimal operating parameters that maximize material removal rate. An efficient and robust learning method to identify the stability lobe diagram and optimal operating parameters with a limited number of tests/data points.

18 Claims, 13 Drawing Sheets

```
N1  (--- pgm_start.txt ---)
N2  (STABILITY_TESTING)
N4  G28 G90 X0. Y0. Z0. B0. C0.
N5  G53 G0 Z0.
N6  T08 M06
N4  G54 G90
N7  S9000 M3
N8  G0 Z10.0
N9  G1 X-0.0 F0.0
N10 Y-0.0
N11 Z-0.0
N12 X0.0
N13 Z20.0
N14 M5
N15 M9
N16 G53 Z0.
N17 M30
```

*Fig. 9A*

```
N1  (--- pgm_start.txt ---)
N2  (STABILITY_TESTING)
N4  G28 G90 X0. Y0. Z0. B0. C0.
N5  G53 G0 Z0.
N6  T08 M06
N4  G54 G90
N7  S9000 M3
N8  G0 Z10.0
N9  G1 X275.4 F2160.0
N10 Y-1.35
N11 Z-5.3
N12 X-25.4
N13 Z20.0
N14 M5
N15 M9
N16 G53 Z0.
N17 M30
```

*Fig. 9B*

STABILITY BOUNDARY AND OPTIMAL STABLE PARAMETER IDENTIFICATION IN MACHINING

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND

In machining, for a given radial immersion, e.g., defined as a percentage of the tool diameter, a stability boundary is defined by the limiting axial depth of cut as a function of spindle speed. If the axial depth of cut is smaller than the limiting axial depth of cut, the spindle speed—axial depth of cut combination is stable; else, it is unstable.

With the stability boundary, the best spindle speeds may be selected that enable stable machining at higher axial depths of cut to maximize the material removal rate. For a given tool-material combination, calculating the stability boundary generally requires knowledge of the tool point frequency response function and the cutting force coefficients. These two input requirements can impose a significant hurdle for implementing the stability boundary to maximize material removal rate in a production environment.

Without knowledge of these inputs, machining parameters are typically determined using tool supplier and handbook recommendations, or previous experience and will be sub-optimal.

Furthermore, although analytical and numerical models exist to predict stability, they are typically treated as deterministic and do not consider the uncertainty in stability boundary location. Therefore, experiments are often necessary to verify the predicted stability boundary and identify parameters which maximize material removal rate.

The experiments are typically performed using a grid-based design of experiments where test cuts are performed at pre-selected spindle speed and axial depth combinations at a given radial immersion. The machining parameters for each test (spindle speed, axial depth of cut, and radial immersion) are entered manually into a G-code to perform the test cut.

The grid-based approach is time-consuming, inefficient, and expensive. There is a need for an iterative design of experiment strategy which will incorporate the test objective and converge to the optimum in minimum number of experiments.

Some conventional technologies focus on recommending or modifying spindle speed to eliminate chatter. Two examples of conventional systems are: Harmonizer from Manufacturing Labs Inc (MLI) (See https://www.mfg-labs.com/products.html) and Okuma Machining Navi system (See https://www.okuma.co.jp/english/onlyone/process/).

The Harmonizer system recommends test spindle speed to eliminate unstable cutting based on the frequency response of the microphone signal. In general, the goal of the harmonizer is to identify stable machining parameters by modifying the spindle speed if the machining parameters are unstable. The Okuma Navi system adjusts spindle speed in real-time if unstable machining conditions are detected and prevent chatter.

Some conventional technology for CNC machine communication exists but is limited to static operations. G-code is created before processes begin and transmitted to the CNC machine. Similarly, commercial drip-feed systems exist to feed the G-code to the machine, but are also limited to static G-code instructions. The instructions cannot be updated during the process. Here are two examples of such conventional systems: DNC Precision (See https://www.aggsoft.com/dnc-precision.htm) and OneCNC (See https://onecnc.net/en/support/downloads). Other conventional technologies are described in the following articles: Karandikar, J. M., Tyler, C. T., Abbas, A., & Schmitz, T. L. (2014). Value of information based experimental design: Application to process damping in milling. Precision Engineering, 38(4), 799-808. The publication describes a test procedure to identify the process damping coefficient (model parameter) in the analytical stability model using value of information; and Karandikar, J., Traverso, M., Abbas, A., & Schmitz, T. (2014). Bayesian inference for milling stability using a random walk approach. Journal of Manufacturing Science and Engineering, 136(3). The publication uses a random walk Bayesian updating method to update the probability of stability using experimental results. Test strategy to identify experimental parameters are described for a pocketing operation with the objective of reducing machining cost.

SUMMARY

The present disclosure provides a system and method for learning stability boundary using test results, an iterative experimental design considering user test objective and the risk tolerance, incorporating frequency content from an unstable cut in the stability learning procedure and provides feedback control by communicating G-code updates to the CNC machine.

Embodiments of the present disclosure can include a closed-loop system for automated identification of optimal stable parameters in machining using Bayesian machine learning. The closed-loop system can include a process monitoring architecture, an analysis framework, and a feedback system. The machine state and test cuts can be monitored through MTConnect or another protocol and an audio or other sensor signal. The Bayesian machine learning algorithm can calculate the probability of stability at grid points given test results. The probability of stability can be subsequently used to calculate a recommended test grid point that increases the expected improvement in material removal rate. The G-code can be updated with the test parameters and communicated to the machine based on the machine status. The test cut can be classified as stable or unstable based on the audio signal and the process can be repeated until convergence to a particular criterion, such a threshold or optimal stable parameter. The closed-loop control system provides a low-cost and quick method for identifying optimal stable parameters in an industrial environment.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 9A illustrates an exemplary G-code template for stability testing.

FIG. 9B illustrates exemplary G-code for stability testing updated with a selected axial depth of cut and spindle speed.

DESCRIPTION OF THE CURRENT EMBODIMENTS

Figure 1:
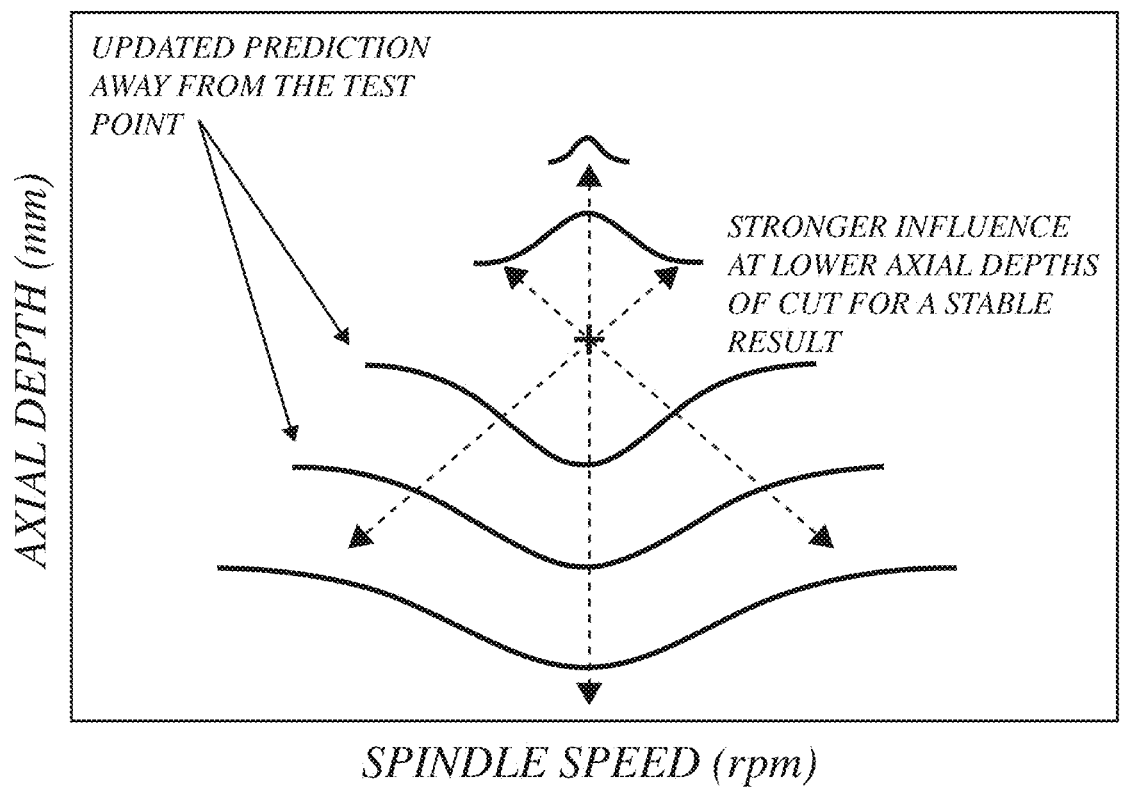
FIG. 1 illustrates a representative graph that shows the influence of a stable result of a cutting process physics encoded in a Bayesian learning algorithm were axial depths of cut below a test axial depth of cut are stable resulting in a larger influence.

Some embodiments of the present disclosure focus on learning the stability boundary from experimental results and an experimental procedure for learning the stability boundary with an iterative risk-based experimental strategy by establishing communication between a control computer and a CNC machine. One objective of some embodiments of the present disclosure is to reduce the number of experiments to identify the stability boundary or stable machining parameters considering user risk preferences, such as a set of recommended stable machining parameters.

One system in accordance with a current embodiment of the present disclosure includes the following:
  a physics-guided machine learning algorithm stored in memory accessible by a controller/processor to learn a stability boundary using experimental results;
  an adaptive risk-based experimental cut algorithm to reduce the number of experimental cuts to identify a stability boundary or recommend stable machining parameters based on the experimental objective;
  a method for communicating the stability boundary or recommended experimental cut parameters from the control computer to the CNC machine G-code and perform the experimental cut; and
  an acoustic sensor to monitor the cutting operation and determine if the experimental cut result was stable or unstable (e.g., through analysis of the sensor output on the control computer).

Some embodiments of the present disclosure relate to a system and method for stable parameter identification for machining. Many embodiments of the system and method generally include system configuration, physics-guided machine learning, experimental cut strategy, communication between a control computer and a CNC machine, and data acquisition. Each of these general steps and a number of variations for various embodiments of the present disclosure are discussed in turn below.

System Configuration

There are a number of user selectable options available in some embodiments of the present disclosure. For example, the user can select the machine, tool, and material combination. This configuration can enable the system and method to determine a stability boundary for that combination of machine, tool, and material. This configuration can enable the system and method to determine recommended stable machining parameters for that combination of machine, tool, and material. Stability boundary determination can generally refer to determining the stability boundary over a combination of spindle speeds and axial cut depths for a particular combination of machine, tool, and material. Stability boundary determination can also refer to determining a set of recommended stable machining parameters for a particular combination of machine, tool, and material.

In one current embodiment, a material block 800 (e.g., See FIG. 8) having a block length and block width can be setup on the machine for stability boundary determination. The user can input (or the system can be configured to automatically detect or receive information regarding) some or all of the following information to an algorithm using a software graphical user interface (GUI):

tool diameter, number of flutes, flute length, and helix angle;

material name; material block width, breadth, and height available for the test cuts;

the range, e.g., minimum and maximum, for spindle speed, axial depth of cut, and radial immersion for testing;

step size for spindle speed, axial depth, and radial immersion, e.g., default values are 100 rpm, 0.1 mm, and 5%, respectively, feed per tooth;

frequency response function, e.g., tool point or standard artifact; the input is optional if the information is available;

objective for the experiments; stability boundary identification or optimal machining parameter identification; current known stable operation parameters (if available);

user risk tolerance.

Physics-Guided Machine Learning

A physics-guided machine learning algorithm can be configured to provide a probabilistic prediction of stability given experimental cut results in accordance with embodiments of the present disclosure.

The probability of stability at each spindle speed, axial depth, and radial immersion combination can be simulated prior to experimentation. For example this can be accomplished using a Monte-Carlo simulation by propagating input uncertainties in a measured/modeled frequency response function and cutting force coefficients through an analytical stability model.

If frequency response function information is not available, it can be generated using a user's domain experience or another way. For example, the user can assign a range for natural frequency, stiffness, and damping ratio for the tool; the true value is expected to lie within the range selected. The values are sampled in a Monte-Carlo simulation, the frequency response function is calculated for each sample, and subsequently propagated through the analytical stability model to calculate the stability boundary.

As one alternative, the probability of stability can be determined by using the knowledge that the system is more likely to get an unstable cut as the axial depth is increased at any spindle speed. In this case, the analytical stability model need not be used. Instead, the probability of stability can be presumed to reduce linearly, e.g., from 1 at axial depth of cut equal to 0 to 0.05 at the maximum axial depth of cut at all spindle speeds and radial immersion values.

When an experimental result is available, the probability of stability at each parameter combination can be updated using a physics-guided machine learning algorithm. This can be accomplished using the knowledge of the stability boundary. The following assessments can be made from knowledge of the stability boundary. The influence of the test result reduces as the distance from the test point increases in spindle speed and axial depth of cut. However, from the knowledge of the stability boundary, the influence of the test point is not symmetric along the axial depth of cut. At the test spindle speed, a stable result generally implies that all axial depths of cut smaller than the test axial depth of cut are also stable.

Therefore, a stable result will have a larger influence along the spindle speed at axial depths of cut smaller than the test axial depth of cut. Furthermore, the smaller the axial depth of cut, the larger the influence of the stable result since the width of the stability lobe as a function of spindle speed increases at smaller axial depths of cut. At axial depth values larger than the test axial depth of cut, the influence of the test result reduces as the distance from the test axial depth of cut increases. Similarly, an unstable result implies that all axial depths of cut larger than the test axial depth of cut are unstable. Therefore, an unstable result will have a larger influence at axial depths of cut larger than the test axial depth of cut.

Furthermore, for an unstable result, the chatter frequencies can be used to identify the location of the best spindle speeds at which there is a higher likelihood of being stable. The influence of the test result can be treated as symmetric about the test spindle speed at all axial depths. This information can be used to generate synthetic data using the available experimental results and feed into a machine learning algorithm, such as a neural network.

For example, if a cut with an axial depth of 5 mm at about 5000 rpm spindle speed is stable at a certain radial immersion, all axial depths of cut smaller than 5 mm are also stable with certainty. In a Bayesian framework, knowledge of the stability boundary can be encoded in the likelihood probabilities for each experimental result and stored in memory. To the extent a user enters any prior known stable operating parameters, the information can be used to update the probability of stability at each grid point before an experiment is performed.

Below, a description is provided of technical details of a method for updating probability of stability using Bayesian inference and an experimental strategy to identify experimental parameters related to material removal rate, such as a maximum material removal rate.

Experimental Strategy

Depending on the objective, the experimental parameters for the test cut can be calculated using an maximum expected improvement in utility criterion shown in Eq. 1.

$$\mathbb{E}[I(MRR)]_g = p(s_g)U_{g_s} + p(s_u)U_{g_u} - U_{prior} \quad \text{(Equation 1)}$$

$p(s_g)$ refers to the probability that the grid point is stable, $p(u_g)$ refers to the probability that the grid point is unstable, and $U_{g_s}$ and $U_{g_u}$ is the utility given the grid point is stable or unstable respectively and $U_{prior}$ is the utility before experimentation.

The utility values can be calculated using a utility function that defines the user risk preferences. As noted, the user can define the objective for testing as: (1) stability boundary identification or; (2) optimal machining parameter identification that maximize material removal rate. The utility for the two objectives can be defined as follows.

Stability boundary identification. To identify the entire stability boundary, the goal is to reduce the uncertainty in the entire domain. The uncertainty will be zero if the probability of stability is either zero or one at each grid point. The uncertainty is equal to 0.5 if the probability of stability at all grid points is 0.5. The uncertainty of the grid is defined as the average uncertainty of all grid points; the value is between 0 to 0.5. The utility of the current grid uncertainty, $U_{prior}$, is taken as zero. Utility is defined over reduction in uncertainty across the entire grid before any experimentation. At each grid point, the expected improvement in utility can be calculated using the probability of stability and the utility given the grid point is stable or unstable using the reduction in uncertainty values.

Optimal parameter identification. The goal is to identify the stable machining parameters which maximize the material removal rate. The utility is defined over improvement in current optimal material removal rate for the known stable operating parameters. If the current stable parameters are not known, the current optimal material removal rate is taken as from the lowest spindle speed, axial depth of cut, and radial depth of cut from the range of values. The utility of current material removal, $U_{prior}$, is taken as zero. At each grid point, the expected improvement in utility can be calculated using the probability of the grid point being stable and unstable and the corresponding utility, where the utility is calculated using the improvement in material removal rate at the grid point and the utility function. To the extent a grid point is unstable, the corresponding material removal rate is the last known optimal material rate giving a utility of zero. The optimal test parameters maximize the expected improvement in utility.

Communication Between Control Computer and CNC Machine

Figure 6:
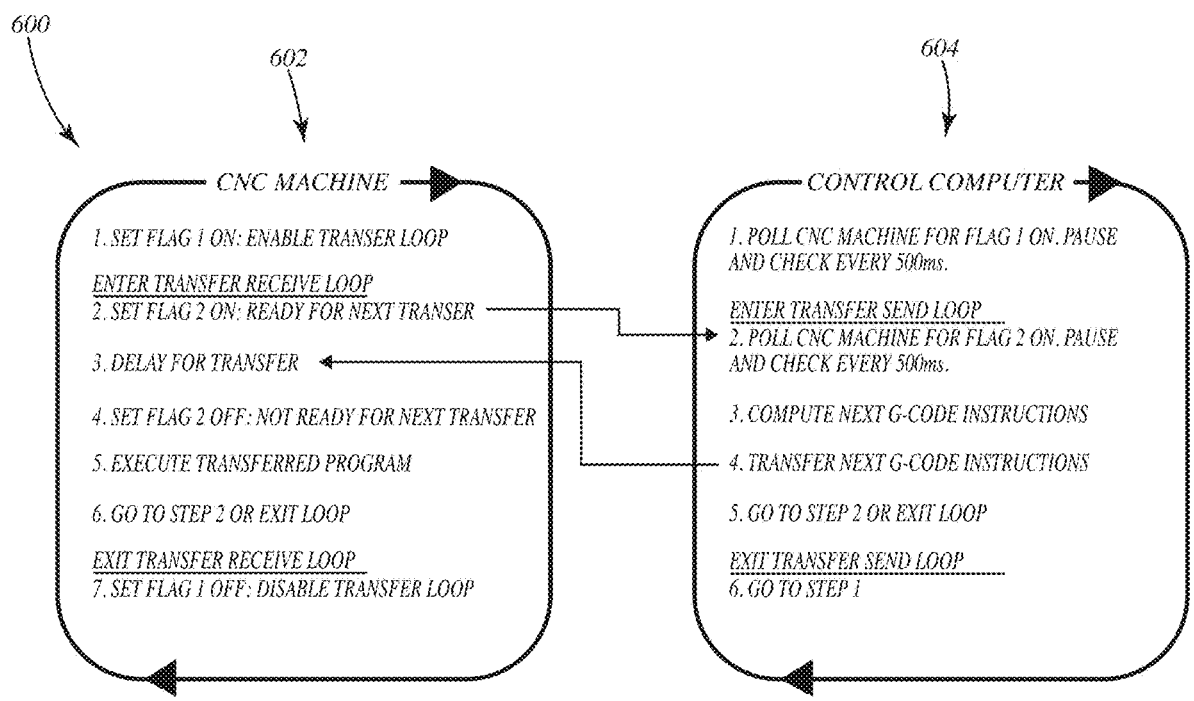
FIG. 6 illustrates an exemplary representational implementation of a portion of closed-loop control for automated instruction communication and execution.

A method to communicate the recommended experimental parameters 600 to the CNC machine 602 in accordance with an embodiment of the present disclosure will now be described. A parameter recommendation algorithm can be run on a control computer 604. The algorithm updates the G-code with the recommended experimental parameter. The revised version of the G-code is stored by the script in a file in memory for communication to the machine. As shown in FIG. 6, the CNC machine 602 is continually running a main program, which can be referred to as Program A and can be generally defined by the depicted pseudocode. During operation, Program A can be configured to periodically call a sub program, Program B, and execute it before returning to operations in Program A. In the depicted embodiment, Program B is executed on a separate control computer 604. When either Program A or Program B are called, indication flags are set in variables on the CNC machine 602. While Program A is in operation, the supporting computer 604 recognizes the state of the CNC machine by reading flags and transfers Program B to the machine tool with updated G-code instructions. After this point, the computer pauses while Program B executes, performing the test cut 145.

Data Acquisition

During the experiment, the process can be monitored using sensors. A low-cost data acquisition unit can be used to collect vibration and audio data. Sampled data is transmitted via a wireless data architecture to the supporting computer. The data can be cleaned to reduce noise and influence from outside processes. The data can be fed through a Fast Fourier Transform ("FFT") or other frequency analysis algorithm. Various metrics of the resulting frequencies can be used to determine if the cut was stable or unstable. One metric includes calculating the ratio of the chatter frequency amplitude to the fundamental tooth passing frequency amplitude, referred to as the stability ratio. If the stability ratio is greater than 0.5 (or another selected threshold), the cut can be considered unstable. Else, it can be considered stable. The result can be communicated to the computer for use in determining the next set of cutting parameters.

After each test, the physics-guided machine learning algorithm can calculate the probability of stability at each grid point. The calculated probability of stability at each grid point can be used to calculate recommended experimental parameters for the next test using the expected improvement in utility criterion. The G-code can be updated by the control computer and communicated to the machine to perform the experiment. The procedure can be repeated for a predetermined number of tests or until another criterion is met. To eliminate the need for cleanup passes after every test cut, the algorithm starts with the maximum user selected radial immersion. The radial immersion is kept constant and the algorithm proceeds by recommending the axial depth and spindle speed. The experiments proceed until the remaining block depth is less than the test axial depth of cut at which point a cleanup pass is performed. The tool increments in the radial immersion for the next series of experiments. The procedure is repeated at additional radial immersions.

One embodiment of the disclosed test procedure can be summarized as follows:

1) calculate the initial probability of stability at each grid point;
2) calculate the expected improvement in utility at each grid point;
3) determine the optimal test parameters which maximize the expected improvement in utility;
4) generate the G-code with the experimental parameters and communicate to the machine;
5) perform test at the optimal test parameters;
6) record sensor signal during experiment and determine if the test is stable or unstable using the stability ratio;
7) recalculate the probability of stability using the experimental results;
8) repeat steps 2-7 till end of experimental budget or if maximum expected improvement in utility is less than a pre-determined threshold.

The disclosed embodiments can be beneficial over conventional technologies in many ways. For example, the current embodiments explicitly consider the objective of the experimentation as well as the risk preferences of the user in selection of the experimental parameters. The choice of the test parameters may be different if the objective is to identify the entire stability boundary as opposed to identifying an optimal material removal rate. Conventional technologies do not help if the current parameters are stable, but sub-optimal. Furthermore, the current embodiments enable, for a given test objective, the choice of the test parameters to depend on the risk preferences of the user. Further, the disclosed algorithm suitably recommends axial depth of cut in addition to spindle speed for the test cut. Conventional technologies only adjust/recommend spindle speed to eliminate chatter; the axial depth of cut is user selected and constant for the testing. Further, the disclosed algorithm can provide a stability boundary prediction after every test. The prediction can be archived by the system, for example at the user's direction, and used for subsequent use of the machine and the tool for different applications. Further, the disclosed technologies provide a system for updating G-code and communicating information to a CNC machine to enables feedback control of an entire experimental sequence. The disclosed feedback control can be operated in conjunction with essentially any commercial CNC machine.

The disclosed embodiments can be implemented by a machine tool builder or an OEM as a method to identify the stability boundary and optimal machining parameters that maximize material removal rate, thereby improving productivity and reducing machining costs.

Herein a description is provided of technical details of a method for updating probability of stability using Bayesian inference and an experimental strategy to identify experimental parameters related to material removal rate, such as a maximum material removal rate.

High speed machining remains an important capability for discrete part manufacturing. To select operating parameters, the stability lobe diagram, which separates the stable axial depth of cut—spindle speed combinations from unstable (or chatter) combinations, may be used.

The regeneration of surface waviness during material removal is the primary mechanism for chatter in machining. With the stability lobe diagrams can be utilized to select spindle speeds that enable stable machining at higher axial depths of cut. In general, a preferred spindle speeds occur where the tooth passing frequency is an integer fraction of the natural frequency that corresponds to the most flexible structural mode of vibration. For a given tool-material combination, calculating the stability lobe diagram involves knowledge of the tool point frequency response function and the cutting force coefficients. The frequency response can be measured using a tap-test, where an instrumented hammer is used to 'tap' the tool and the corresponding response is measured using a transducer (such as an accelerometer). Each tool-holder-spindle-machine combination has a unique frequency response and can be measured with a tap test or calculated analytically (e.g., using receptance coupling substructure analysis or another suitable analysis technique). The mechanistic cutting force coefficients for the tool-material combination can be determined using a linear regression to the mean force values measured over a range of feed per tooth values. Reliably providing these two inputs can impose a significant hurdle for implementing a stability lobe diagram to maximize material removal rate in a production environment. Without knowledge of the tool point frequency response and the cutting force coefficients for the tool-material combination, machining parameters are typically determined using tool supplier and handbook recommendations, or previous experience (i.e., what worked before). If unstable behavior or chatter is observed, the parameters are generally tuned using trial and error until stable behavior is obtained. Typically, this means reducing the spindle speed and the axial depth of cut. Furthermore, although analytical and numerical models exist to predict stability, they are typically treated as deterministic and do not consider the uncertainty in stability boundary location. This is due to inaccuracy in the measured/modeled frequency response function, cutting force coefficients, assumptions in the stability model, and factors that are not known.

One goal of the current embodiments is to increase or maximize material removal rates in a production environment, without knowledge of the underlying system dynamics or the tool-material cutting force coefficients. Some of the current embodiments focus on accomplishing this goal by:

Systematically learning the stability boundary using experimental results, and

Lowering or minimizing the number of experiments to reliably identify an optimal stable axial depth—spindle speed combination with a high (e.g., above a predetermined threshold) material removal rate.

Other systems have attempted to utilize a Bayesian random walk approach to identify optimal stable parameter combinations using profit as the objective function. The random walk method has two main limitations. First, it is computationally expensive to generate the initial paths. Second, as the paths are filtered with each update, the updated model becomes coarse and loses accuracy.

Some of the current embodiments implement one or more modifications of a Bayesian learning approach to determine the stability boundary from experimental results. Some embodiments define a prior and likelihood function that considers the underlying physics and the nature of the stability behavior. Some embodiments implement an adaptive experimental strategy to identify the optimal parameter combination with the maximum material removal rate is presented. Some embodiments implement both of these approaches.

Bayesian Machine Learning for Stability Identification and Strategy for Test Parameter Selection Exemplary embodiments of Bayesian machine learning methods for stability map identification and the strategy for test parameter selection will now be described in detail. One objective of a Bayesian machine learning method is probabilistic modeling of stability over the spindle speed-axial depth of cut domain given test results (stable or unstable). The Bayesian learning method enables learning the stability behavior with or without information on the structural dynamics and cutting force model coefficients using a small number of test points. Traditional machine learning methods, such as neural network or support vector machines, have two main challenges for stability identification in milling. First, machine learning models are purely data-driven and agnostic to the physical laws governing the process, resulting in predictions that may violate the operational constraints or physical laws for the process. Second, machine learning models require many data points to generalize beyond the training dataset and predict the stability map accurately. With the Bayesian learning method, knowledge of the process physics can be incorporated into the Bayesian learning framework. This enables the Bayesian learning method to converge to the stability boundary using a small number of test data points.

One Bayesian machine learning method for stability boundary identification is as follows. Before any tests are performed, a probability of stability map is generated in the spindle speed-axial depth of cut domain (denoted as the prior). This is done by discretizing the axial depth and spindle speed ranges into a grid of points and assigning a probability of stability to each point. If the information on the structural dynamics and the cutting force model is not available, the probability of stability is decided from the knowledge that it is more likely to observe an unstable result at higher axial depths of cut. After an experimental result is made available, the posterior probability of stability is given by the Bayes' theorem as shown in Eq. 1:

$$p(s_g | r_t) = \frac{p(r_t | s_g) p(s_g)}{p(r_t)} \quad (1)$$

In Eq. 1, p denotes probability, s denotes stability, r denotes the test result, subscript g denotes an arbitrary grid point, and subscript t is the test point. The test result at grid point t can be either stable or unstable. According to the Bayes' rule, the posterior probability of stability at any point g given experimental result at t, denoted by $p(s_g|r_t)$, is the product of the prior probability of stability at g, $p(s_g)$, and the likelihood probability of experimental result given g is stable, $p(r_t|s_g)$, divided by the probability of the result, $p(r_t)$. Eq. 1 can be used for one or multiple test results at different test parameters in the domain. For multiple experimental results, the posterior probability of stability after the first experimental result becomes the prior for the second result and so on. Alternatively, multiple experimental results can be used simultaneously to calculate the posterior by taking a product of the likelihood probabilities for each experimental result. The physics and knowledge of the process can be encoded in the Bayes' learning algorithm through the prior and the likelihood probabilities.

Figure 2A:
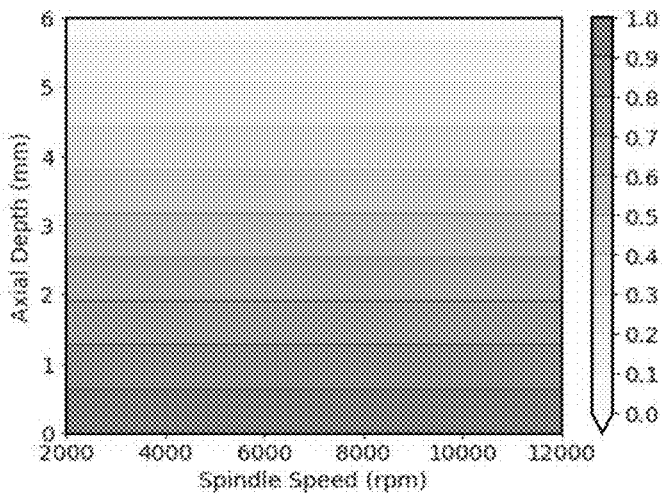
FIG. 2A illustrates an exemplary spindle speed vs. axial depth graph of prior probability of stability.
Figure 2B:
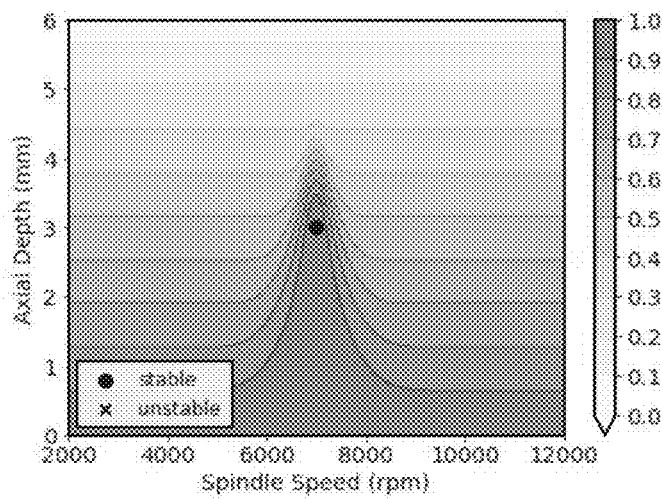
FIG. 2B illustrates an exemplary spindle speed vs. axial depth graph of posterior probability of stability for a stable result at a 6500 rpm spindle speed and 5 mm axial depth.
Figure 2C:
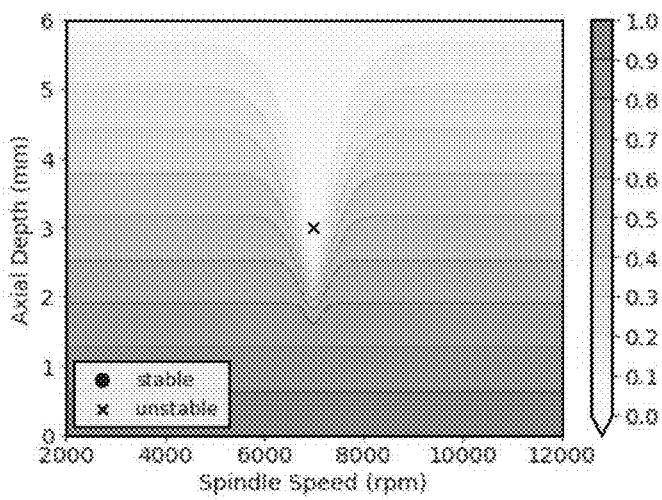
FIG. 2C illustrates an exemplary spindle speed vs. axial depth graph of posterior probability of stability for an unstable result at a 6500 rpm spindle speed and 5 mm axial depth.

To illustrate an implementation of a milling Bayesian learning method, consider a spindle speed range from 2000 rpm to 12000 rpm and an axial depth of cut range from 0 mm to 6 mm. FIG. 2A shows the prior probability of stability and FIG. 2B shows the updated probability of stability given stable result and FIG. 2C shows an unstable result at a spindle speed of 7000 rpm and an axial depth of cut of 3 mm. In this exemplary case, the prior probability of stability is taken to decrease linearly from one at the minimum axial depth of cut to 0.05 at the maximum axial depth of cut. As noted, the physics of the stability diagram is also encoded in the likelihood probabilities. For example, if a test result is stable, all axial depths of cut greater than the test axial depth of cut at the test spindle speed are also stable. As seen from FIG. 2A-C, one test result enables updating the probability of stability over a range of spindle speeds and axial depths, not just the test point. As noted, this is one advantage of Bayesian learning over traditional machine learning approaches, such as neural networks or support vector machines, which require large datasets to establish input-output correlations.

The recommend test parameter can be decided based on an expected improvement in material removal rate, MRR, criterion. The expected improvement in MRR at a grid point can be defined by Eq. 2:

$$\mathbb{E}[I(MRR)]_g = p(s_g) \times \frac{(MRR_g - MRR_{prior})}{MRR_{prior}} \quad (2)$$

Figure 3:
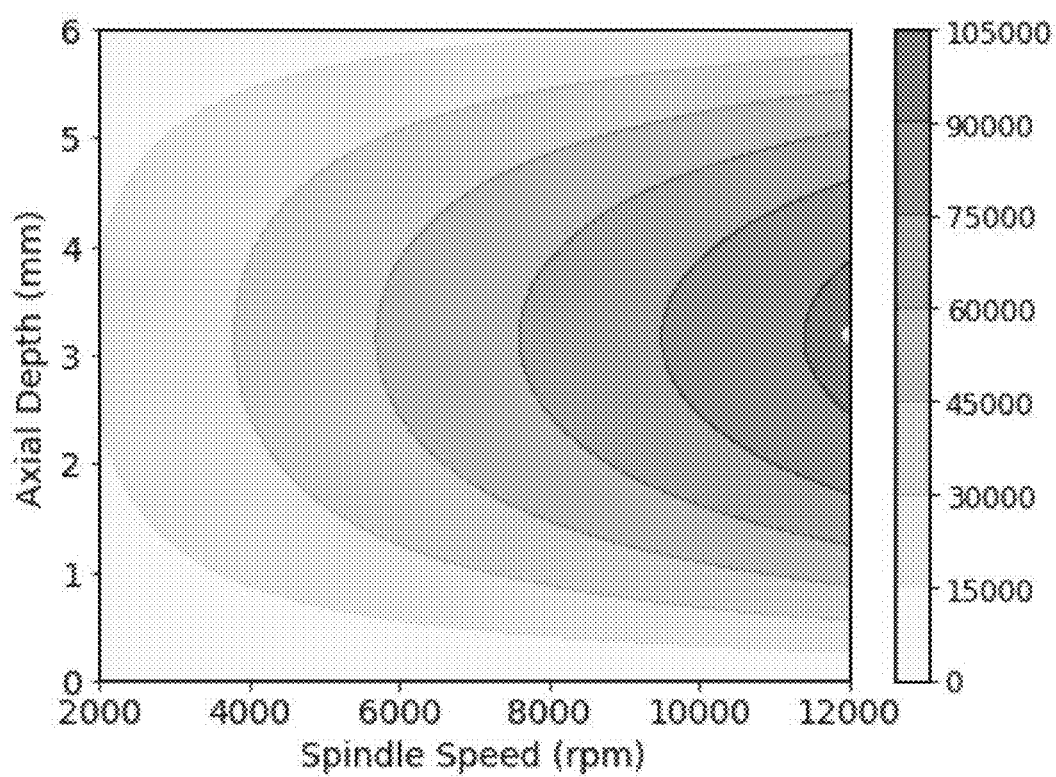
FIG. 3 illustrates an exemplary spindle speed vs. axial depth graph depicting expected utility expressed as an expected percentage improvement in material removal rate for a risk-neutral user. In this example, the recommended test point is at 12,000 rpm spindle speed and 3.2 mm axial depth.

In Eq. 2, $\mathbb{E}$ denotes expectation, I denotes improvement, subscript g denotes an arbitrary grid point, $MRR_{prior}$ is the optimal MRR based on the prior probability of stability, and $MRR_g$ denotes the MRR at the grid point g. $MRR_{prior}$ is determined as the highest MRR among parameters that are stable with certainty in the domain. The $\mathbb{E}[I(MRR)]$ criterion balances the trade-off between the probability of stability at a grid point and the improvement in MRR if the result at the grid point is stable. FIG. 3 shows $\mathbb{E}[I(MRR)]$ at all spindle speed-axial depth grid points given the linear prior probability shown in FIG. 2A; the grayscale bar shows $\mathbb{E}[I(MRR)]$ as percentages. The optimal or recommended test point in this exemplary scenario is at a spindle speed of 12,000 rpm and an axial depth of cut of 3.2 mm because those are the parameters that are expected to produce the highest improvement in material removal rate. Since no stable operating points are generally known before testing, the prior optimal point in this example was 12000 rpm spindle speed and 0.01 mm axial depth of cut.

Figure 4:
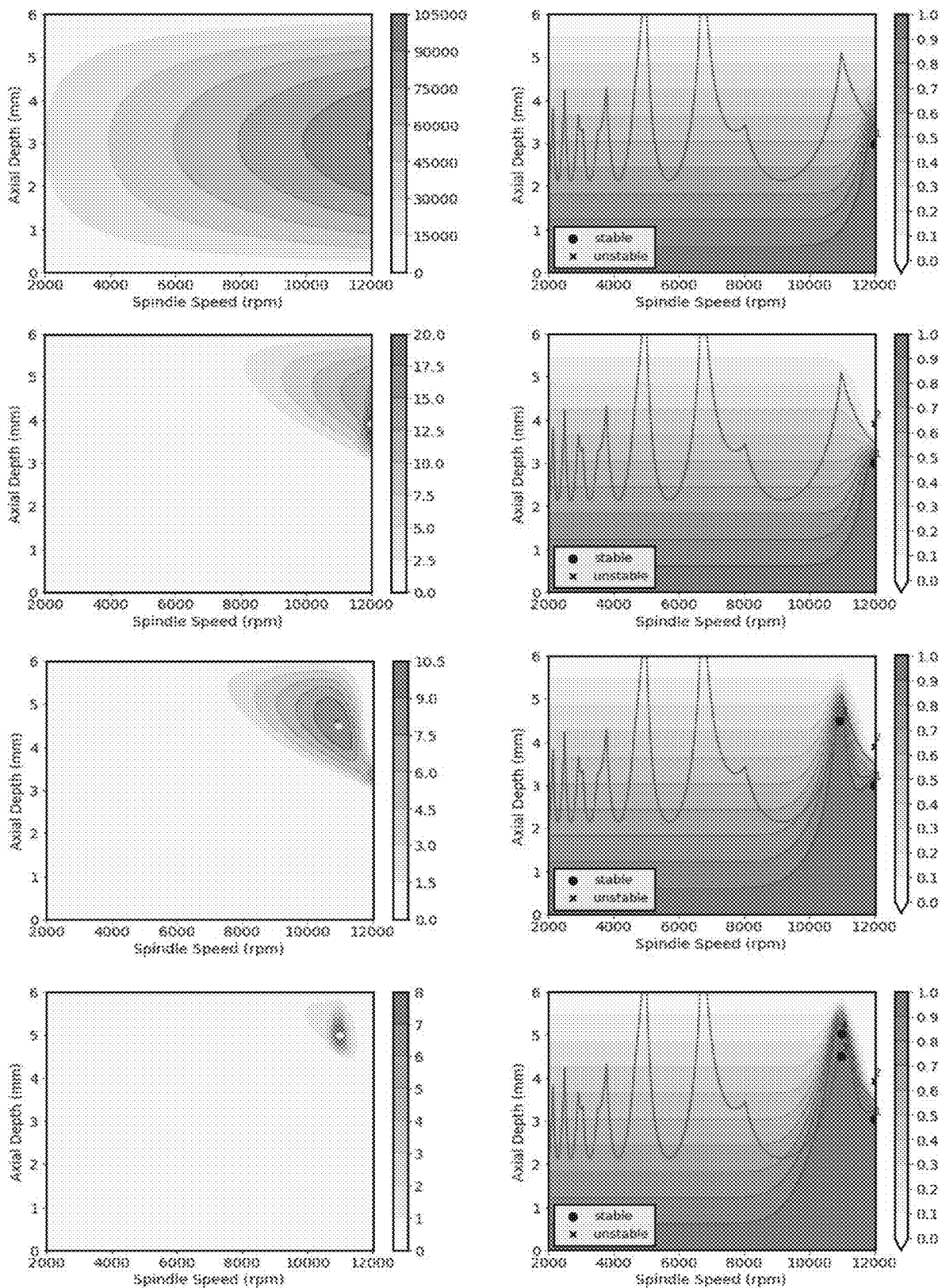
FIG. 4 illustrates a test sequence and Bayesian learning method for stability where the left column exemplary graphs show expected improvement in material removal rate as percentages for each test and the right column shows the posterior probability of stability using the test result. An exemplary analytical stability prediction line is overlaid on the right column panels for comparison.

FIG. 4 illustrates an exemplary embodiment of the present disclosure. In particular, FIG. 4 illustrates a Bayesian learning method and a sequence of tests using $\mathbb{E}[I(MRR)]$ criterion. In FIG. 4, the test result is determined using an analytical stability boundary overlaid on the right column graphs. The left column graphs show expected improvement in material removal rate $\mathbb{E}[I(MRR)]$ for each test and the right column shows the posterior probability of stability using the test results. The sequence of tests is shown on the posterior probabilities of stability. The updated probability of stability after each test is used to calculate the test parameter for the next test using the expected improvement in MRR shown in Eq. 2. If the test result is stable, the $MRR_{prior}$ is updated to the MRR at the stable test parameters. As seen from FIG. 4, the algorithm converges to optimal stable parameters in four tests for the analytical stability boundary (the line overlaying the right column graphs). In general, the testing can be terminated when the $\mathbb{E}[I(MRR)]$ is less than 5% because this is considered to be optimal stable parameters. In other embodiments, a different metric for optimal stable parameters could be utilized. For example, an expected improvement of material removal rate of less than 10%, 20% or some other threshold could be utilized, or a different metric, e.g., a metric considering user risk tolerance. Convergence to a set of stable parameters can typically be achieved in 10 to 20 tests with the expected improvement in the MRR criterion.

This Bayesian learning approach can be extended to include the radial depth of cut to identify the optimal stable axial depth, radial depth, and spindle speed combination.

Closed-Loop Control for Machine Communication

This section describes the closed-loop control mechanism for machine communication. This exemplary embodiment of the closed-loop communication system generally includes three parts:

- an architecture to capture, communicate, and store information about the process;
- an analysis framework to compare current actions against the desired actions and compute corrective steps; and
- a feedback mechanism to provide updates to the machine instructions The process monitoring architecture can be implemented on a standard PC-based computer next to the CNC machine, another suitable computer architecture. In this exemplary embodiment, the computer is connected to the CNC controller via Ethernet and communicates using the TCP/IP protocol, providing a pathway for information output and input. In other embodiments, a different communication architecture and protocol can be utilized. MTConnect and OPC-UA are two common protocols for capturing machine information that can be utilized in conjunction with this system. The protocols provide information from the machine controller, such as the machine state, current machine position, feed rate, spindle speed, and part program line number. The MTConnect protocol defines a common formatting standard for the information, which can increase flexibility over multiple machines and controllers. A support framework captures process data generated by the CNC machine and provided via an XML file through MTConnect. The desired process tags such as machine state, machine position, and process parameters are parsed from the process data. Each of these process tags can be converted into a local nomenclature for comparison across multiple machining systems. This enables the simultaneous storage of all process data for external analysis and immediate processing of selected variables to inform the feedback mechanism. In addition to the data from the machine controller, external sensors can be retrofitted to the machine. The choice of external sensor can depend on the specific manufacturing process. In machining, some common external sensor can include, but are not limited to, current and power sensors, accelerometers, and microphones. Similar to MTConnect and OPC-UA protocols, sensor data can be converted into a local format for processing. Information from the machine protocols can be synchronized with the external sensors in the support framework.

An analysis framework governs the type of data collected by the process monitoring framework. The analysis framework is responsible for managing communications to and from the machine, triggering calculations for the next set of machine instructions, and triggering the feedback mechanism to communicate the instructions to the CNC controller. Multiple processes can be involved in the analysis, depending on the type, amount, and format of data collected. The analysis framework of the exemplary embodiment being described herein relies on a common JSON data structure, with messages sent via Message Queue Telemetry Transport (MQTT). Other embodiments can utilize a different suitable analysis framework and data structure. The analysis can be completed on a standard PC-based computer or another suitable system. A new set of instructions for the machine can be generated using monitoring data from the machine, which can be communicated to the machine using the feedback flags or another feedback system.

Figure 5:
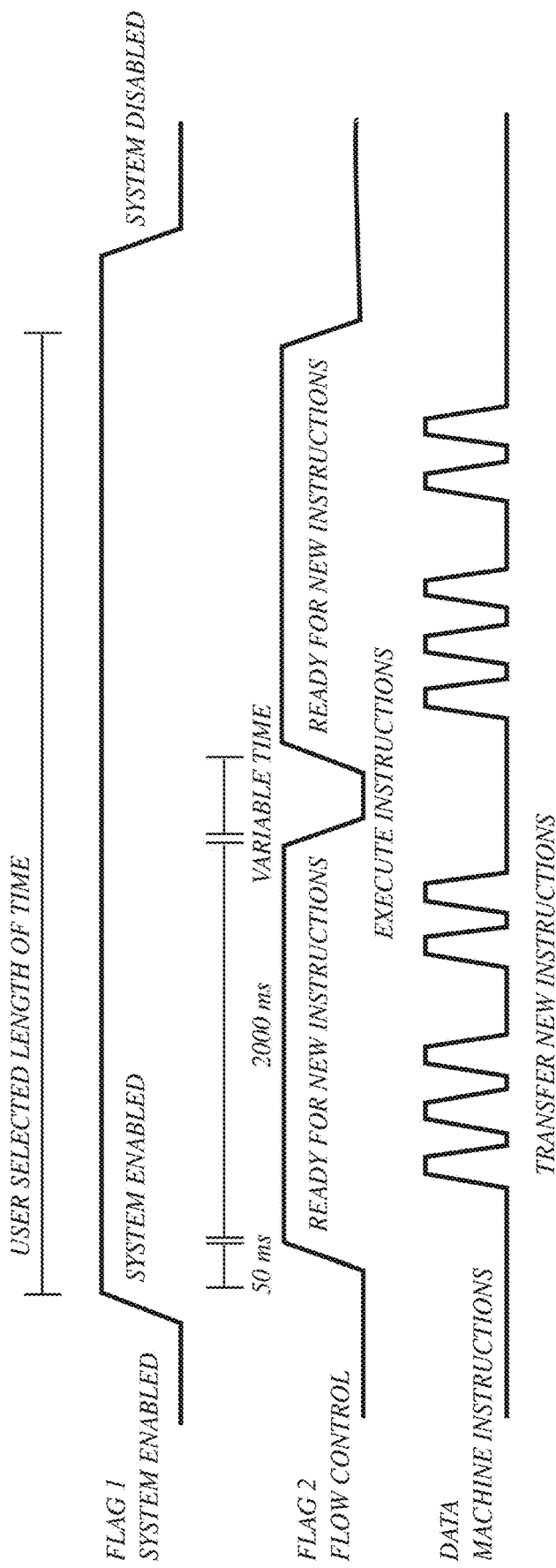
FIG. 5 illustrates an exemplary timing diagram for the feedback to update CNC machine instructions.

The feedback system of the current embodiment enables timed updates to the current instructions on the CNC machining system. A series of flags can be used between the CNC machine and the process monitoring architecture to determine when additional commands can be sent, following the timing sequence illustrated in FIG. 5. FIG. 5 shows a time of 2000 ms to transfer new instructions to the machine; this can be defined or selected by the user. In this embodiment, once the user enables the feedback process, the flag is set to high (1) and it signals that additional commands can be sent, overwriting previous commands in the specified memory location. The CNC machine then signals that no more instructions can be written by setting the flag low (0). Finally, the updated instructions are parsed by the machine, and the motion paths are executed. The CNC machine resets the flag to high (1) after the motion paths are executed indicating that it is ready for the next set of instructions. FIG. 6 displays one generic operational flow 600 for the feedback process. In general, this flow can operate between any commercial CNC system 602 with a standard operating system and control computer 604.

System for Automated Stability Testing with Closed-Loop Control

Figure 7:
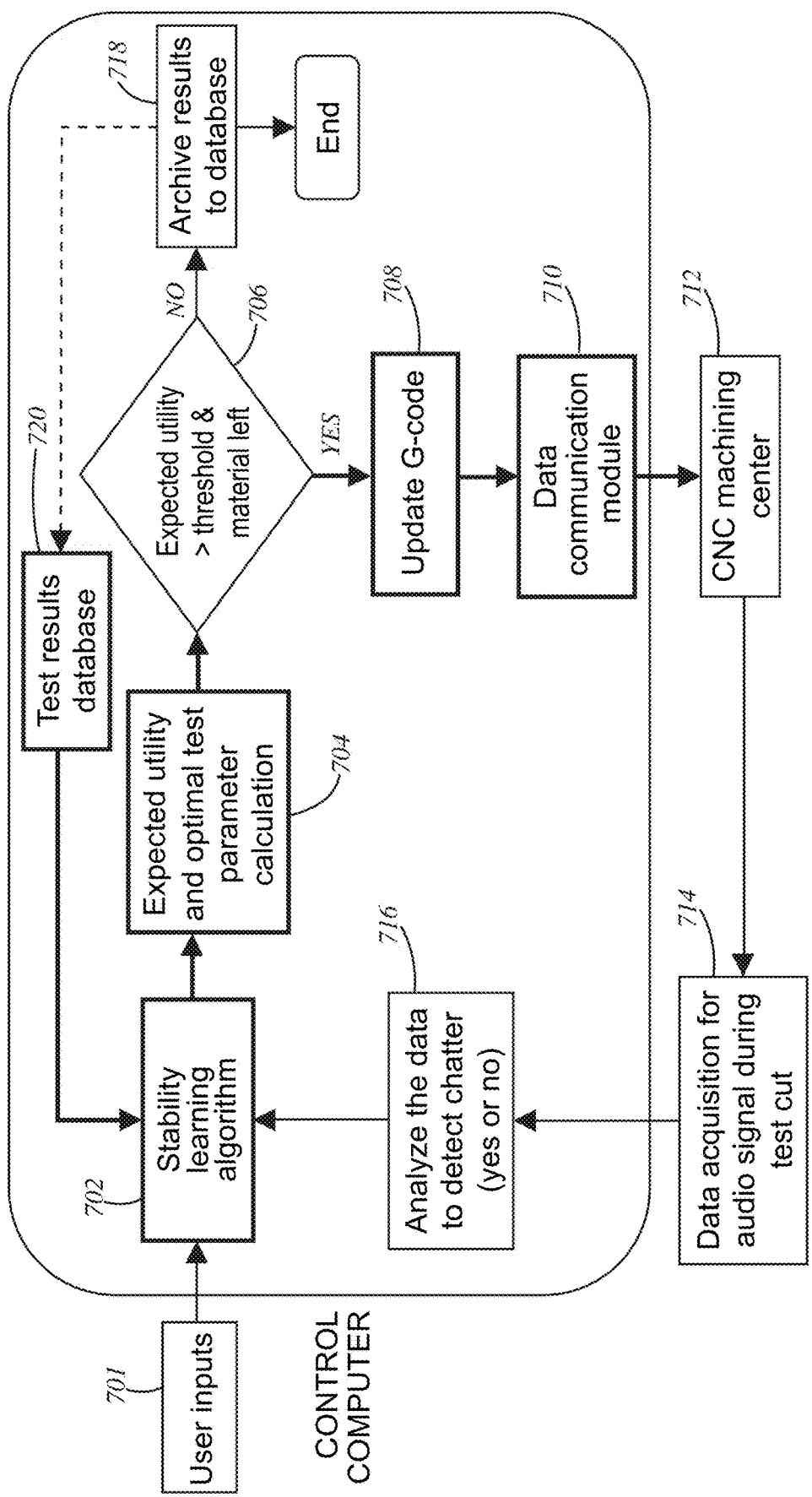
FIG. 7 illustrates an exemplary process for one embodiment of the automated stability testing system.

This section describes one exemplary application of Bayesian learning and closed-loop control for automated stability testing. FIG. 7 shows one exemplary embodiment of a closed-loop control system flowchart in accordance with the present disclosure. This exemplary process generally begins with a user inputting information relating to the material for testing, tool, and process parameters. The stability tests in this embodiment are performed on a rectangular block of material, see FIG. 8. The exemplary inputs for the block include the maximum allowable cut length, width, and depth for testing and the material type. Tool information includes the type of tool (e.g., square, ball nose, or bull nose), tool diameter, number of teeth, helix angle, and pitch type (e.g., fixed or variable). In alternative embodiments, additional, different, or less tool information can be provided by the user. Process parameter information can include the axial depth and spindle speed ranges, feed per tooth, radial depth of cut, and the type of cut (e.g., up milling or down milling). The user can also input stable operating parameters, if known.

The flow diagram of FIG. 7 will now be described in detail:

The Bayesian stability learning algorithm 702 calculates the probability of stability in the spindle speed-axial depth of cut domain (the spindle speed and axial depth of cut ranges are discretized with a step size of 10 rpm and 0.1 mm, respectively in this exemplary embodiment);

the test parameter selection algorithm 704 calculates the optimal test parameters (spindle speed and axial depth) to test based on the expected improvement in material removal rate $\mathbb{E}[I(MRR)]$ criterion and compares that expectation to a threshold considering the amount of material left 706;

the G-code is updated 708 with the selected test parameters and transferred 710 to the machine;

the machine performs the test cut at the selected parameters 712;

an audio signal (and/or other sensed parameters) is recorded during the test 714 and the communicated to the control computer to classify the cut as stable or unstable 716;

steps 702-716 are repeated until the expected improvement in material removal rate $\mathbb{E}[I(MRR)]$ is less than 5%, or another threshold value (or until another criterion is met).

Once the expected utility is deemed satisfactory, the optimal stability parameters can be recorded 718, for example to a database, for use with that combination of material, tool, and process. Information about the parameters as well as other information can be stored in a test result database 720 and utilized to improve the stability learning algorithm or other aspects of the process and system.

Figure 8:
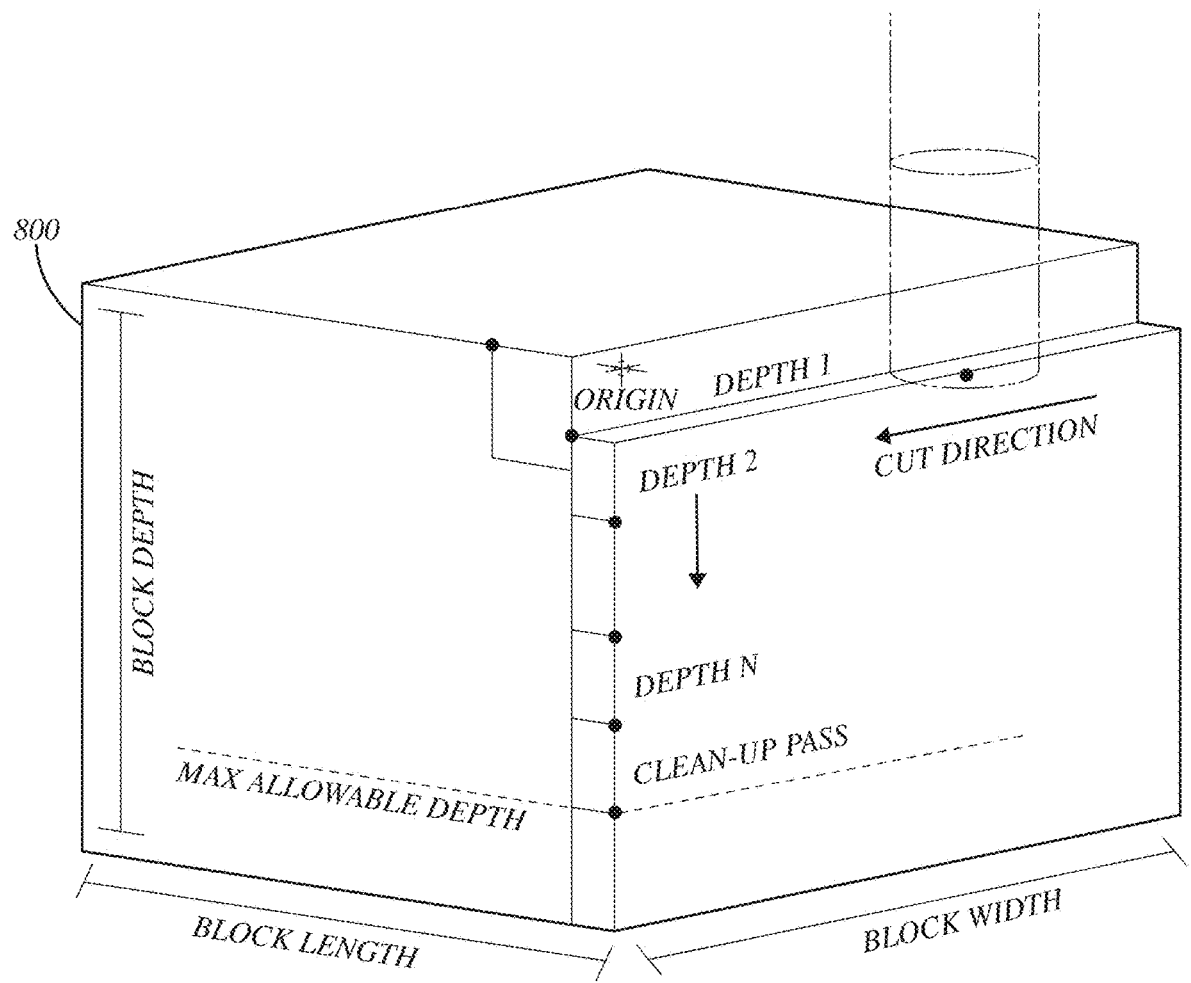
FIG. 8 illustrates an exemplary depth of cut progression across a test block to determine machining stability. A clean-up pass can be used if the selected test axial depth of cut exceeds the remaining available stock.

Referring to FIG. 8, the process for making exemplary test cuts on a rectangular block of material will now be described. The left-forward corner of the test block 800 can be set as the origin. The starting coordinate and the ending coordinate in the X-axis for the tool path can be determined based on the type of cut, up or down milling, or other factors as noted by the user or otherwise provided to the system. The test cuts proceed using the axial depth of cut at the user-defined radial depth of cut, illustrated in FIG. 8. If the recommended test axial depth of cut is greater than the remaining block depth, a clean-up pass can be performed at an axial depth of cut equal to the remaining block depth. The tool can then increment in the radial depth of cut for the subsequent test. This is illustrated in FIG. 8.

EXAMPLE

This section describes an exemplary implementation utilizing a Mazak VC-500A/5X AM HWD Hybrid machine. The Mazak has a Mazatrol SmoothX controller and operates on the Windows 7 platform. Table 1 lists the machining parameters (i.e., the user inputs 701 in FIG. 7).

TABLE 1

Machining parameters for testing

| # | Variable | Value |
|---|---|---|
| 1 | Workpiece material | Aluminum 6061-T6 |
| 2 | Workpiece length | 250 mm |
| 3 | Workpiece width | 100 mm |
| 4 | Workpiece depth | 15 mm |
| 5 | Tool diameter | 12.7 mm |
| 6 | Number of teeth | 4 |
| 7 | Axial depth of cut range | 0 mm to 10 mm |
| 8 | Spindle speed range | 4000 rpm to 9000 rpm |
| 9 | Feed per tooth | 0.06 mm/tooth |
| 10 | Radial depth of cut | 5 mm |
| 11 | Type of cut | Down milling |

The machine state in this exemplary implementation is monitored through the MTConnect protocol. The machine is connected to a local network such that a secondary local computer can send and receive information. A machine state monitoring script is programmed in Python, enabling the local computer to receive MTConnect information produced by the machine via HTTP GET commands. Current machine state, machine position, user flags, and process parameters are parsed from an XML file and saved to the local machine at a frequency of 2 Hz. At the start of testing, a user flag is set to high (1) to indicate the machine is ready for the next set of instructions. The flag value is monitored through the MTConnect protocol. The analysis framework, including a Bayesian machine learning process and test parameter selection process, is triggered in response to the flag value being high. The exemplary algorithms are implemented in Python. As noted, before any tests were performed, the Bayesian learning method started with an uninformed prior (See FIG. 2A) based on the user-defined spindle speed and axial depth of cut range. The test parameter selection algorithm used the prior probability stability to calculate the optimal test parameters via Eq. 2.

FIG. 2A shows an exemplary prior probability of stability for a selected tool and the expected improvement in material removal rate IE [I(MRR)] in percentage for an exemplary first test can be seen in FIG. 3. The user input on block dimensions, process parameters, and the calculated test parameters can be used to update the G-code. A G-code template for the Mazak machine can be provided to the analysis framework as a starting point (e.g., see FIG. 9A). The algorithm can update the starting and ending X-axis position of the tool based on the block length. The Y-axis position can be calculated using the radial depth of cut and the feed can be calculated using the selected spindle speed, feed per tooth, and the number of teeth on the tool. Exemplary updated G-code is depicted in FIG. 9B. In particular, the spindle speed is updated in line number N7, the X positions are updated in line number N9 and N12, the feed is updated in N9, the Y position is updated in N10, and the axial depth of cut is updated in N11.

The underlying operating system of the Mazak controller is Windows. In alternative embodiments, the machine controller can run on a different operating system. The Mazak controller enables various memory locations internal and external to the controller to be mapped and networked, which provides a suitable pathway to feed information back into the machine. Furthermore, current values of macro variables can be changed via G-code commands during live operations. The primary hard drive of the controller can be networked to the local computer such that the computer can read and write files in a specific directory. This is one exemplary way in which to enables a connected feedback loop, where the local computer could read the current status of the Machine via MTConnect and transfer the updated G-code to the machine via the networked hard drive.

In this exemplary embodiment, two G-code programs were used to operate the CNC machine, a primary control program, and a secondary sub-program. In alternative embodiments, additional or fewer G-code programs may be utilized. In this exemplary embodiment, the user initially executes the primary control program. This program sets the appropriate macro variables to signal that the machine tool has entered closed-loop control mode. The local computer polls the macro variable's status at a rate of about 2 Hz. A variable delay can be used to provide computation time for the local computer to analyze current data, generate the next set of instructions, and transfer them to the machine. Once ready, the local computer can transfer a new set of instructions to the networked memory location on the Mazak controller's hard drive, coinciding with the secondary sub-program location. This new set of instructions can include any commands enabled by standard G-code, such as machine setup, toolpath, or inspection operations. After the delay expires, the controller can enter the sub-program and execute the G-code statements. Finally, the sub-program can return to the main program, and the flag can be reset to indicate that updated instructions were requested. This loop can repeat until a termination signal is given by the local computer, e.g., upon a particular criterion being met.

One exemplary process for automated stability testing with closed-loop control will now be discussed in additional detail. The user first enables the closed-loop control process on the machine and the supporting computer. The CNC machine sets a system flag high (1) to indicate that it is ready for the next set of instructions. The machine is monitoring the system flags via MTConnect to determine when it is safe to write to the specified memory location. When the CNC machine flag is detected as high (1), it triggers the calculations to determine the optimal test parameters and update the G-code. After the flow control time flag time expires on the machine, the CNC machine sets the flag low (0), indicating that it is executing the G-code to perform the test cut and preventing the transfer of additional information from the local computer. The flow control flag time is user-defined and was set as 2000 ms.

Once a test is complete, the machine returns to the home position, and the flow control flag is reset to high (1), triggering the next set of calculations and notifying that the CNC machine is ready for the updated G-code. The analysis updates the probability of stability using the test result (stable or unstable) provided by the operator with the Bayesian machine learning method, calculates the test parameters for the next test and updates the G-code. The updated G-code with the next set of parameters is uploaded to the machine's memory and the loop repeats until $\mathbb{E}$ [I (MRR)] is less than 5% or if the test material is exhausted.

An audio signal (or other signal) can be recorded during the test cut and be used to classify the test cut as stable or unstable. The microphone signal in this exemplary embodiment was sampled at 20 KHz during the cut. A Fast Fourier Transform (FFT) of the time-based audio signal collected during the test cut can be calculated and the resulting spectrum can be comb filtered to remove the tooth passing frequency and higher harmonics. The dominant frequency can be identified from the filtered spectrum. The cut can be classified as unstable if the amplitude of the dominant frequency exceeds a certain threshold value. The threshold value can be calibrated based on the background noise during the test process. The process monitoring framework can enable integration of the audio signal (or other sensed signal) and the associated analysis for a completely automated system.

Figure 10A:
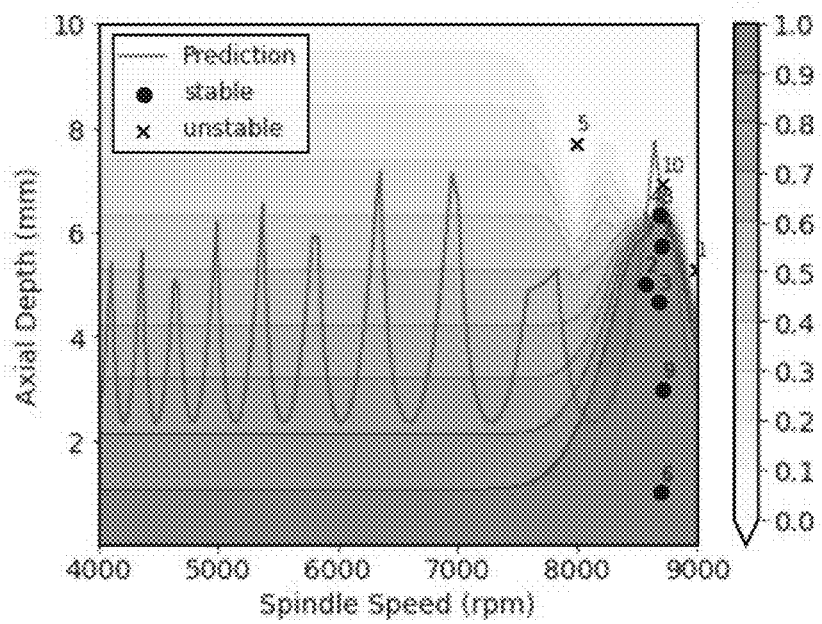
FIG. 10A illustrates exemplary test results for the stability parameter detection process of the present disclosure for a 12.7 mm diameter tool.
Figure 10B:
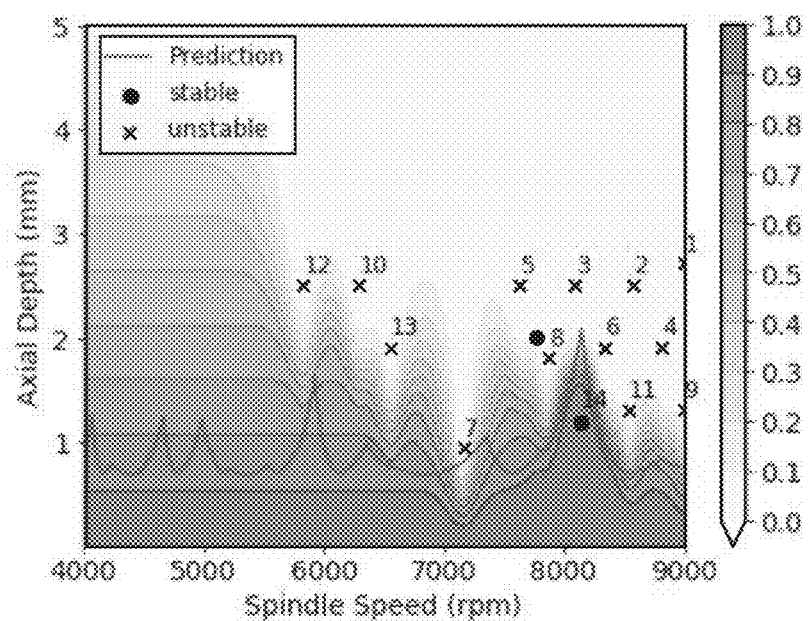
FIG. 10B illustrates exemplary test results for the stability parameter detection process of the present disclosure for a 9.525 mm four-tooth endmill.

FIG. 10A-B shows exemplary results of two examples. The block dimensions, feed per tooth, and radial depth of cut, and the type of cut are listed in Table 1. In these examples, the tests were terminated when the expected increase in material removal rate $\mathbb{E}[I(MRR)]$ was less than 5%. In one example, the optimal point after 10 tests for a 12.7 mm diameter tool was at a spindle speed of 8710 rpm and an axial depth of cut of 6.3 mm. An analytical prediction for the tool is shown in an overlay line on the FIG. 10A graph. As depicted, the system converged to an optimal set of stable parameters in 10 tests.

FIG. 10B illustrates exemplary results for the process as repeated for a 9.525 mm four-tooth endmill. The spindle speed and axial depth of cut ranges were 4000 rpm to 9000 rpm and 0 mm to 5 mm, respectively. The same block dimensions, feed per tooth, and radial depth of cut, and the type of cut were used and are listed in Table 1. The sequence of tests and posterior probability of stability for the 9.525 mm diameter tool identified an optimal stable point at a spindle speed of 8150 rpm and axial depth of cut of 1.6 mm. The analytical prediction using the FRF measurement is shown using an overlaid line on the graph. The stability boundary for this example was at a much lower axial depths cut compared to the selected maximum axial depth of cut. This resulted in many unstable tests as seen in FIG. 10B.

Although an expected improvement in material removal rate criterion, denoted as $\mathbb{E}[I(MRR)]$, can be used to select an optimal set of test parameters, other criterion can be utilized. Although the expected improvement in material removal rate criterion generally leads to fast convergence to optimal stable parameters, it can result in a number of unstable tests in cases where the optimal stable axial depth of cut is a small fraction of the selected maximum value for the axial depth of cut. In general, this is due to a product of the linearly decreasing prior probabilities of stability and linearly increasing material removal rate as a function of axial depth of cut. This can present a challenge in automating the testing of tools (e.g., because of the resulting vibrations and forces from an unstable cut can damage the tool (and potentially the tool holder and spindle)), which can disrupt the automated testing process.

Figure 11A:
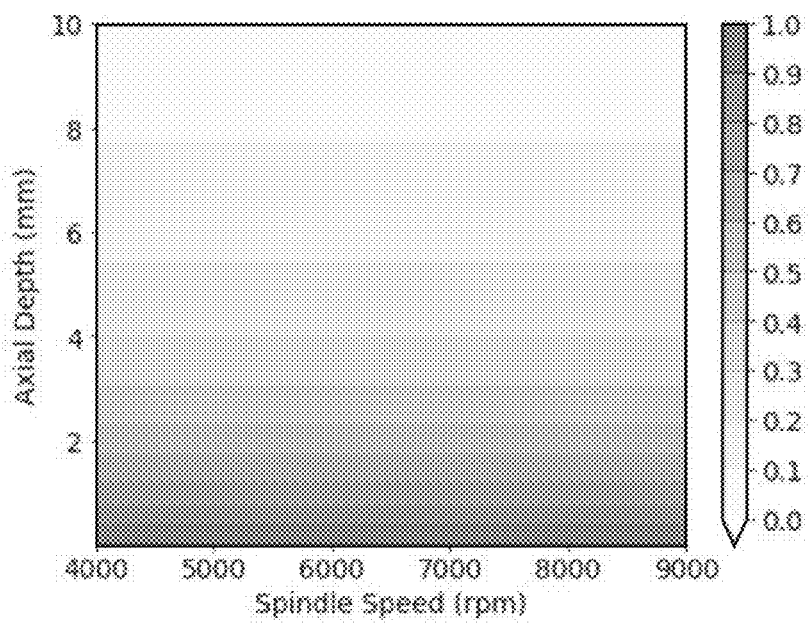
FIG. 11A shows an exemplary prior probability of stability using non-linear reduction in probabilities with axial depth of cut for a 12.7 mm diameter tool.
Figure 11B:
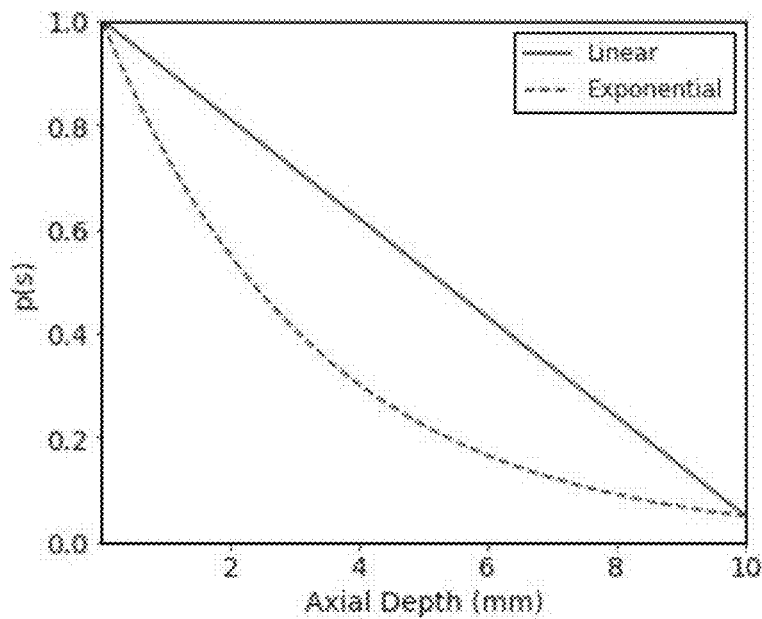
FIG. 11B shows a comparison between linear and non-linear reduction in prior probabilities as a function of axial depth of cut.

The present disclosure includes two test point selection algorithms that can address this issue. First, prior probabilities can be decreased non-linearly using an exponential decay function. This can reduce the axial depth of cut for the first test. FIG. 11A shows an exemplary prior probability of stability using non-linear reduction in probabilities with axial depth of cut for a 12.7 mm diameter tool. FIG. 11B shows a comparison between linear and non-linear reduction in prior probabilities as a function of axial depth of cut.

Figure 12A:
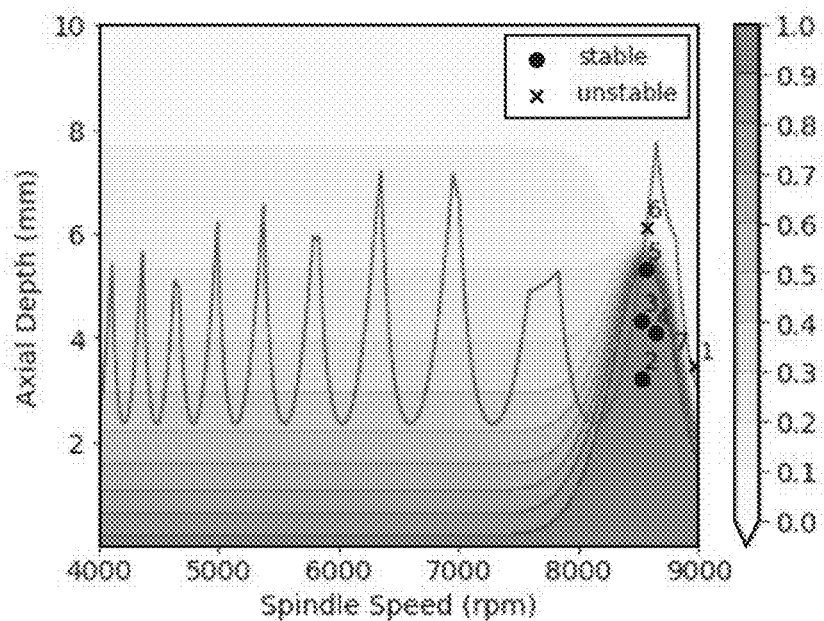
FIG. 12A shows exemplary results of a stability parameter detection process of the present disclosure for a 12.7 mm diameter tool utilizing an exponential decay function.
Figure 12B:
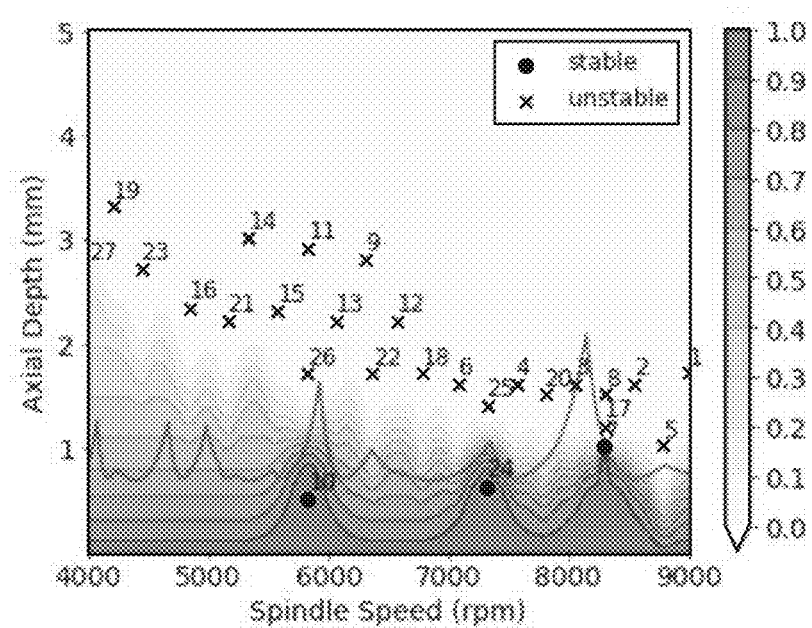
FIG. 12B shows exemplary results of a stability parameter detection process of the present disclosure for a 9.525 mm diameter tool utilizing an exponential decay function.

FIG. 12A displays exemplary results for a 12.7 mm diameter tool and a 9.525 mm diameter tool utilizing the exponential decay function. For FIG. 12B, although the first test axial depth of cut is lower, the algorithm doesn't show improvement in eliminating the unstable test cuts for the 9.525 mm diameter tool. This is because once a stable result is identified, the algorithm identifies successively higher axial depths of cut which have a higher MRR than the stable test result. Test cuts #10 and #24 for the 9.525 mm diameter tool shown in FIG. 12B are clean-up passes due to the limited test block depth.

Figure 13A:
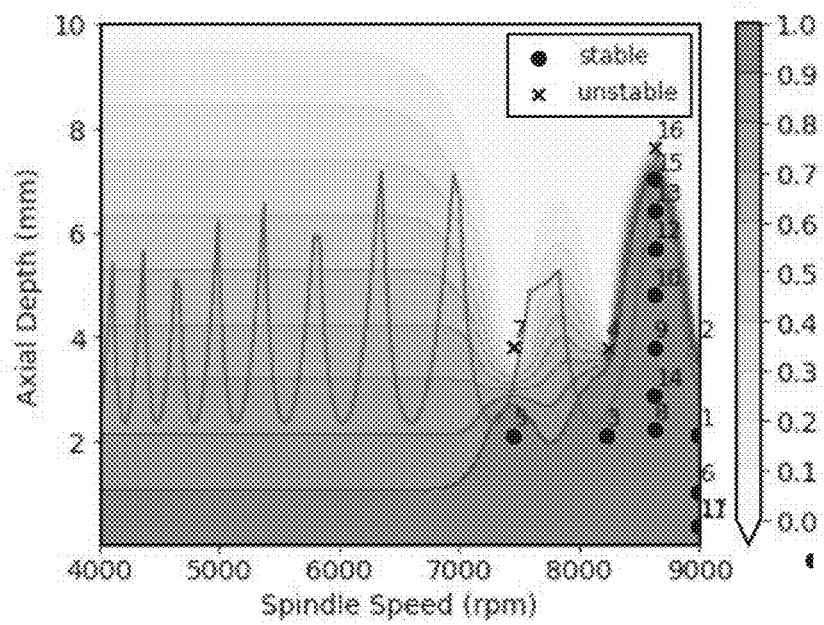
FIG. 13A illustrates exemplary results of a stability parameter detection process for a 12.7 mm diameter tool utilizing a probability of stability equal to or greater than 0.8 at the selected test spindle speed.
Figure 13B:
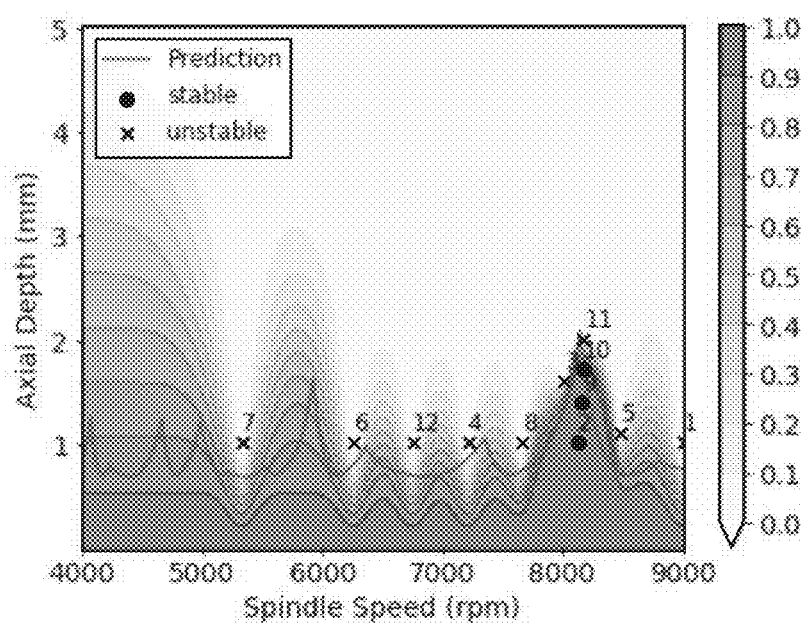
FIG. 13B illustrates exemplary results of a stability parameter detection process for a 9.525 mm diameter tool utilizing a probability of stability equal to or greater than 0.8 at the selected test spindle speed.

There can be two issues with the expected improvement in material removal rate $\mathbb{E}[I(MRR)]$ criterion for automating test parameter selection. First, if the optimal stable axial depth of cut is a small fraction of the maximum axial depth of cut, the criterion may result in some unstable cuts before the optimal parameters are identified. Potentially, this can damage the tool leading to disruptions in testing. Second, after a stable result is identified, the algorithm generally identifies successively higher axial depths of cut which have a higher MRR than the stable test result. To address this, a modified test selection criterion based on a minimum probability of stability at the test parameters can be utilized. With this criterion, if a test parameter selection using the expected improvement in material removal rate $\mathbb{E}[I(MRR)]$ has a probability of stability less than a pre-determined threshold probability, the axial depth of cut is reduced at the selected spindle speed such that the probability of stability equals the selected threshold probability. FIGS. 13A-B shows the results for the two tools with a threshold probability equal to 0.8. The prior probability was linear.

As seen in FIGS. 13A-B, the modified criterion with a threshold probability reduces the number of unstable cuts and eliminates unstable test cuts that may damage the tool. FIGS. 13A-B illustrate an exemplary sequence of test results utilizing a modified criterion of testing at an axial depth of cut with a probability of stability equal to or greater than 0.8 at the selected test spindle speed. FIG. 13A shows exemplary results for the 12.7 mm diameter tool and FIG. 13B shows exemplary results for the 9.525 mm diameter tool. The number of tests to converge can be higher if the optimal stable axial depth of cut is comparable to the maximum axial depth of cut. For example, this is seen in FIG. 13A for the 12.7 mm diameter tool where the number of tests to converge increased from 10 to 16 relative to the FIG. 10A example. However, the modified criterion eliminates test cuts that can be excessively unstable (e.g., test #5 in FIG. 10A) that may potentially cause damage to the tool. In some applications, this modified criterion may be suitable for implementation in an automated test setup with closed-loop control.

Other Systems

Implementation of the described closed-loop control system on a Mazak machine with a Windows-based Mazatrol SmoothX controller relies on a data communication module to provide input instructions to the machine. This module is specific to the machine manufacturer, model, and machine controller. However, the functionality involving the use of networked memory locations, managed by the data communication module, can apply to essentially any machining center whose controllers run a version of the Windows operating system in the background. Further, other methods of information transfer can be utilized to enable implementation on a range of commercial machining centers.

Well-supported controllers such as Siemens, Fanuc, and Linux CNC platforms generally have the capability to accept instruction information through similar setups. A secondary method of providing simple instructions relies on the "DPRNT" serial communication, or TCP/IP functionality in these controllers. When implemented in the data communication module, each line of G-code can be sent and executed individually. This method is generally lower in bandwidth but is supported by most controllers. Additionally, other information transfer opportunities exist in the main program/sub-program structure. While the exemplary implementations described herein generally rely on cohesive blocks of instructions sent as a file (the entire sub-program), the G-code sub-program itself can be parameterized and persistently stored on the controller. In this approach, only the updated parameters are sent via macro variable update commands through the host controller's serial input, or other suitable approach. This methodology can restrict the flexibility of the toolpath geometry but can enable the rapid and efficient update of cutting depth, feed rate, and spindle speed. Additionally, this approach can be leveraged for many legacy controllers without modern networking capabilities.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A controller of a CNC machine, wherein operation of the CNC machine is monitored by a sensing device, the controller comprising:
   a utility-determination module receives a stability-probability map indicative of a respective probability of stability at each grid point of a process space of machining parameters, and determines a respective expected improvement in utility at each grid point based on risk tolerance and the corresponding probability of stability;
   a communications module communicatively coupled with the utility-determination module and the CNC machine, the communications module receives from the utility-determination module a set of machining parameters corresponding to a test grid point associated with an expected improvement in utility, and transmits to the CNC machine the set of machining parameters based on which operation of the CNC machine is to be updated; and
   a stability-detection module communicatively coupled with the sensing device, the stability-detection module receives from the sensing device process signals associated with the updated operation of the CNC machine, and determines whether the updated operation is stable or unstable; and
   a stability-probability module communicatively coupled with the stability-detection module and the utility-determination module, the stability-probability module receives from the stability-detection module the stability determination, recalculates the stability-probability map by accounting for the certainty of stability or instability at the test grid point, and
   provides the recalculated stability-probability map to the utility-determination module,
   wherein the utility-determination module, the communications module, the stability-detection module, and the stability-probability module iterate the above operations until a condition for stopping the iterations is met.

2. The controller of claim 1, wherein
   the utility is determined with an objective of identifying a stability boundary for operating the CNC machine, and
   the utility for identifying the stability boundary is calculated to reduce uncertainty over the process space of machining parameters.

3. A system comprising:
   a CNC machine; and
   the controller of claim 2,
   wherein the CNC machine is operated based on the stability boundary for operating the CNC machine identified when the maximum expected improvement in utility is less than a target value.

4. The system of claim 3, wherein the stability boundary is determined by the controller for a combination of a CNC machine, a tool thereof, and a particular material.

5. The controller of claim 1, wherein the utility is determined with an objective of identifying stable machining parameters which cause the CNC machine to optimize material removal rate without the knowledge of underlying tool dynamics or material cutting force coefficients.

6. A system comprising:
   a CNC machine; and
   the controller of claim 5,
   wherein the CNC machine is operated based on a set of optimal machining parameters used for operation of the CNC machine when the maximum expected improvement in utility is less than a target value.

7. The system of claim 6, wherein the set of optimal machining parameters is determined by the controller for a combination of a CNC machine, a tool thereof, and a particular material.

8. The controller of claim 1, wherein the condition for stopping the iterations is met when the maximum expected improvement in utility is less than a target value.

9. The system of claim 8, wherein the system includes the sensing device.

10. The controller of claim 1 wherein the condition for stopping the iterations is met after a predetermined number of iterations.

11. The controller of claim 10, wherein the predetermined number of iterations is between 10 and 20 iterations.

12. The controller of claim 1, wherein the stability-probability module calculates an initial stability-probability map using a physics-guided analytical model derived based on a frequency response function.

13. The controller of claim 1, wherein the stability-probability module calculates an initial stability-probability map in which probability of stability decreases linearly from 1 at axial depth of cut equal to 0 to a predetermined value at the maximum axial depth of cut at all spindle speeds and radial immersion values.

14. The controller of claim 1, wherein the stability-probability module calculates or recalculates the stability-probability map using a physics-guided machine learning algorithm based on historical operational data of the CNC machine.

15. The controller of claim 14, wherein the physics-guided machine learning algorithm comprises a Bayesian algorithm.

16. The controller of claim 1, wherein the risk tolerance used by the utility-determination module to determine the expected improvement in utility is a user input.

17. The controller of claim 1 wherein the machine parameters comprise spindle speed, axial depth, and radial immersion.

18. The controller of claim 1 wherein the process signals received from the sensing device comprise chatter signals.

\* \* \* \* \*

UNITED STATES PATENT AND TRADEMARK OFFICE
CERTIFICATE OF CORRECTION

| | | |
|---|---|---|
| PATENT NO. | : 12,181,853 B2 | Page 1 of 1 |
| APPLICATION NO. | : 17/529558 | |
| DATED | : December 31, 2024 | |
| INVENTOR(S) | : Jaydeep M. Karandikar et al. | |

It is certified that error appears in the above-identified patent and that said Letters Patent is hereby corrected as shown below:

On the Title Page

Item [73]:
"UT-Battelle, LLC, Oak Ridge, TN (US)"
Should be:
-- "UT-Battelle, LLC, Oak Ridge, TN (US) and University of Tennessee Research Foundation, Knoxville, TN (US) --

Signed and Sealed this
Eighteenth Day of March, 2025

Coke Morgan Stewart
*Acting Director of the United States Patent and Trademark Office*